United States Patent [19]

Goebel et al.

[11] 4,437,689
[45] Mar. 20, 1984

[54] REUSABLE END FITTING

[75] Inventors: Mark B. Goebel, Holyoke; Kenneth E. Lefebvre, Hampden, both of Mass.

[73] Assignee: Titeflex Corporation, Springfield, Mass.

[21] Appl. No.: 250,650

[22] Filed: Apr. 3, 1981

[51] Int. Cl.³ .............................................. F16L 33/22
[52] U.S. Cl. .................................... 285/246; 285/259
[58] Field of Search ............... 285/246, 247, 251, 259, 285/149

[56] References Cited

U.S. PATENT DOCUMENTS 3,008,736 11/1961 Samiran .......................... 285/259 X

FOREIGN PATENT DOCUMENTS 255612 5/1963 Australia .............................. 285/247
1130570 2/1957 France ................................. 285/247
740440 11/1955 United Kingdom ................ 285/251
1188512 4/1970 United Kingdom ................ 285/247
1402291 8/1975 United Kingdom ................ 285/259

Primary Examiner—Dave W. Arola
Attorney, Agent, or Firm—Louis Bernat

[57] ABSTRACT

A reusable end fitting may be attached quickly and easily to a hose without requiring production machinery. The end fitting has a first part with a collar which grips the hose against a second part with a barbed end. When two wrenches are used to turn one part onto the other part, a pilot end of a hose is gripped and pulled onto the barbed end. One embodiment provides a collar with springlike qualities that compress the hose against the barbed end. Another embodiment has threads inside the collar to propel the hose onto the barbed end.

13 Claims, 7 Drawing Figures

REUSABLE END FITTING

This invention relates to fittings for hoses, and more particularly to reusable fittings which may be attached or detached, in field use, and especially to end fittings for "Teflon" hoses. The field attachable reusable fittings are primarily—but not always—intended for field repair of hydraulic and pneumatic systems.

The inventive design is the only known two-piece, totally reusable, field attachable fitting especially for use with braided "Teflon" hoses. The inventive fitting has been used and reused over fifteen times on new hoses and was then tested and found to be capable of meeting 4500 psi pneumatic proof pressure without leakage.

Usually, prior art end fittings of the described type are attached to hoses in a factory where suitable, power actuated, insertion mandrils and compression dies are available. The prior art design, which virtually all other fitting manufacturers use, requires a third piece which is called a separable "sleeve" or "gland". This sleeve is required to achieve sealing. A special tool must be used to loosen the wire braid in order to insert this separate sleeve between the inner liner and outer braid. The sleeve is not reusable and must be replaced when the other components are reused. The sleeve requires a metal-to-metal contact with the part inserted into the hose, in order to achieve a seal. If a perfect metal-to-metal seal is not achieved, fluid passes through the fitting and it leaks. In order to guarantee a metal-to-metal seal, the sleeve is made of a softer metal, which is deformed and which makes it non-reusable. The prior fitting design must also be used with a hose material that is relatively stiff and which has a sufficient column strength to enable engagement with the sleeve. Also, the prior design requires lubricants to aid in assembly and requires special tools to assemble.

When it has been necessary to attach such a prior art end fitting in the field, it has been common practice to force the hose over or into a first threaded part. Then, a second part is turned onto the first part. Usually, one of the parts is tapered to facilitate easy initial insertion, but a great amount of force is then required to complete the insertion. Therefore, a liberal amount of lubricant is required. As the two threaded parts are turned together, a compression wedge is formed and the task becomes quite difficult. When hoses have multi-layers, the forcing of the end part of a fitting onto the hose could cause a delamination of the hose layers.

Accordingly, an object of the invention is to provide new and improved end fittings which may be attached to hoses in the field. Special tools are not required. The insert and socket can be assembled with a minimum of two wrenches. However, if quantity production so dictates, then a bench vise may be substituted for one wrench, for expediency of production.

Here, an object is to provide reusable end fittings which may be repeatedly applied to and removed from hoses.

Another object of the invention is to provide end fittings which actually assist their own attachment to a hose.

Yet another object of the invention is to provide end fittings specifically—although not exclusively—designed for use with "Teflon" hosing.

In keeping with an aspect of the invention, these and other objects are accomplished by a two-piece complementary, threaded end fitting. One of the end fitting pieces tends to grip the hose and to pull it upon the other end fitting piece, as the two pieces are threaded onto each other and then tightened into place. As one of the parts is turned, the hose is pulled against a locking ridge tightly enough to shear off a short selvage section at the end of the hose to provide a better seating and a metal-to-metal locking of the braid. Any braid in the hose is captured at the locking ridge to help hold together the hose and the end fitting against longitudinal displacement. The primary features of the invention are the ability to engage and position the hose without any additional external effort or tooling aids, and the ability to shear the inner liner to achieve a metal-to-metal braid lock.

A preferred embodiment is seen in the attached drawings, wherein.

Figures 1, 2:
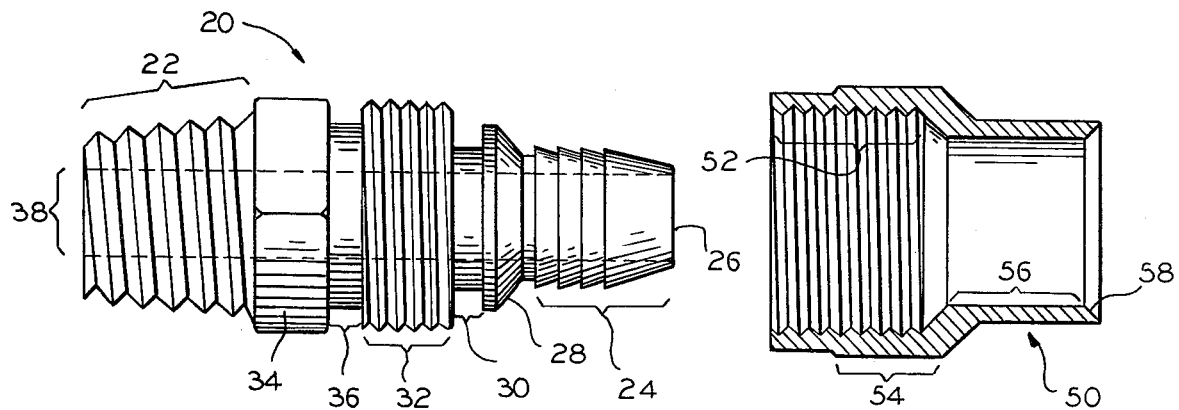
FIG. 1 is an elevation view of one of the end fitting parts, which is an insert that fits inside the hose.
FIG. 2 is a cross-sectional view of the second end fitting part, which is a collar that fits over the outside of the hose and turns onto the part of FIG. 1.

The insert 20 (FIG. 1) has a threaded connector end 22 and a barbed end 24. The outer tip 26 of the barbed end 24 fits into the internal bore of the hose. The taper near the end 26 of the insert 20 preferably has an optimum angle of 10° to 15°. This angle is established to compensate for the minimum and maximum tolerance variation of the liner inner diameter. The front edge of the taper is below the minimum liner diameter and acts as a pilot to assure alignment and engagement. If the taper angle is too great (in excess of 45°), the expansion resistance of the hose would be greater than the force created in the pilot end to pull the hose forward.

The opposite end of the barbed end 24 terminates in a locking and sealing ridge 28. Behind the locking and sealing ridge 28 is a clearance space 30 for receiving the selvage of a tip end sheared from the hose inner liner. The advantage of the shearing operation is to remove a portion of the non-metallic inner liner in order to expose the outer braid and achieve a metal-to-metal broad lock. The hose end should be initially cut squarely within accepted industry practice.

Next comes a threaded section 32 which enables a hose to be pulled upon the barbed end 24. Wrench faces 34 provide a means which enables the two parts to be turned together. The clearance space 36 enables the two parts to turn together without butt-stopping against each other. A bore 38 pierces the entire part to enable a fluid flow therethrough.

In one embodiment, the fitting part 20 is approximately two inches long, and the bore 38 diameter is about a third of an inch. The remaining lengths are approximately: threaded end 22, a half inch; wrench faces 34, a quarter inch; clearance 36, slightly less than a quarter inch; threaded section 32, a little over a quarter inch; clearance 30, about a tenth or an eighth of an inch; locking ridge 28, slightly under a quarter inch; and barbed end 24, about a half inch.

The collar 50 section (FIG. 2) includes a threaded section 52 which complements and turns onto the threaded section 32 of the insert 20. The exterior of this section may include wrench faces 54. The opposite end of the collar 50 terminates in a collar shell 56. The outer end of the shell 56 terminates in a taper 58 which facilitates an insertion of a hose.

The entire collar 50 is a little over an inch long, and is divided more or less equally between the two sections 52, 56.

Figure 3:
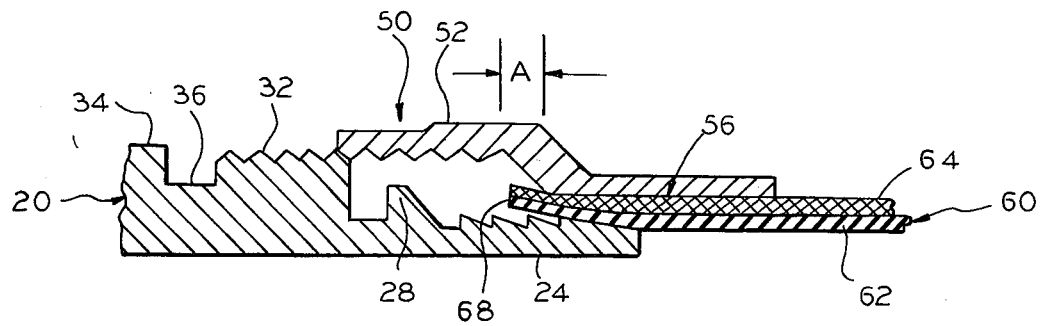
FIG. 3 is a cross-sectional view which shows the initial assembly step wherein the hose is gripped between the two end fitting parts.
Figure 4:
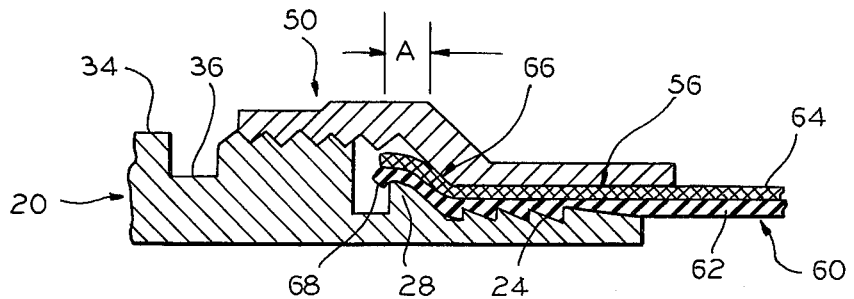
FIG. 4 shows a second assembly step near the end of the attachment process.
Figure 5:
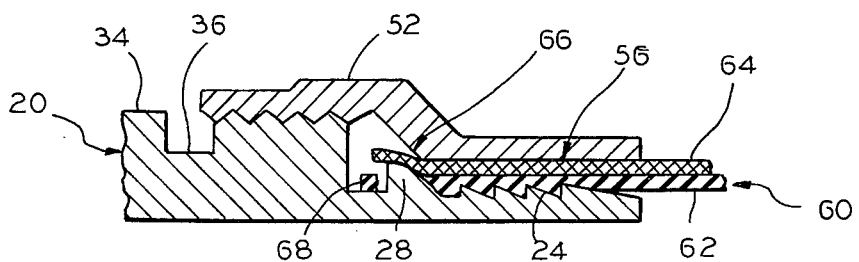
FIG. 5 shows a small sheared end of the hose, which occurs at the end of the attachment process.

The assembly process is seen in FIGS. 3–5. Initially (FIG. 3), a hose 60 is inserted into the collar shell 56, to approximately the beginning of the threaded section 52. Then the insert 20 is positioned to confront the end of the hose 60. The hose has an inner "Teflon" layer 62 and an outer braid layer 64. The two threaded sections 32, 52 come into contact so that they will thread, one onto the other.

It should be noted in FIG. 3 that the end of the hose 60 projects a distance A which forms a pilot section projecting beyond the inside end of the collar shell 56. Therefore, as the two threaded sections 52, 32 come together, the pilot end of the hose 60 tends to become caught between the parts 20, 50, and the deflect over the barbed end 24 of the insert 20. The front or pilot end of the hose is caught between the socket and the insert pilot ramp in order to create an interference fit which enables a starting of the forward movement of the hose. As the hose travels forward, over the barb shanks, the design of the shanks 24 prevents the hose from retracting in a backward direction. As more of the hose comes in contact with the socket inner surface 56, there is a greater ability of the end fitting to drive the hose forward and up the insert shoulder 28. Thus, the pilot end of the hose is somewhat captured and it tends to flare enough for the leading edge of the collar shell 56 to take a bite on it.

As the wrench faces 34, 54 are turned relative to each other, the collar closes in upon the insert 20, pulling the hose with it. Eventually (FIG. 4), the tip end 68 of the hose is captured between the locking and sealing ridge 28 and a complementary metal-to-metal locking shoulder 66 on the collar 50.

A continued turning of the wrench faces 34, 54 shears off (FIG. 5) a selvage end 68 of the preferably "Teflon" hose 62, thereby giving a custom fit between the end of the hose 60 and the locking and sealing ridge 28. The cutting, or shearing, of the inner liner is achieved by a wedging effect as the inner liner is caught between the insert locking ridge shoulder 28 and the socket shoulder 66. The angle of the insert locking ridge shoulder 28 should not exceed 50°, to enable the inner liner to expand outwardly and over the shoulder 28 prior to shearing. These shoulders 28 or 66 need not be hardened, but they must have sufficient compressive and shear strength to overcome the shearing strength of the inner liner. If either the insert or socket is fabricated from a thermoplastic, having compressive and shear strengths which are lower than the corresponding strengths of the hose inner liner, then these shoulders may be reinforced with a hard metal insert which can be encapsulated in place by injection molding. Another alternative is to remove the front section of the inner liner by internal radial cutting. This may be desirable when the hose has multiple braid layers. Such a cutting eliminates the need to shear the inner liner.

The braid 64 is captured between the metal-to-metal locking shoulder 66 and the locking and sealing ridge 28. When metal braid is captured between the upper portion of the locking and sealing ridge 28 and the socket shoulder 66, there is a metal-to-metal lock, which is the purpose for shearing off the front lip of the inner liner. Further, the metal-to-metal lock of the braid superimposes an additional radial compressive sealing load, within the insert barb shank, which load is proportional to any axial load from internal pressure. Any axial load which may be imposed on the insert stretches the outer braid, reducing its diameter, and imposing a radial loading on the inner liner. Therefore, there is no need to provide a separate metal-to-metal sealing member between the insert and socket, which is required by some prior art designs. The result is a very tight metal-to-metal lock, and the captured braid helps to hold the hose 60 in place.

There is no specific value that can be associated with the stretching of the hose. A hose braid structure is generally used to minimize axial and radial growth of the hose during pressurization. However, some growth is inevitable, in direct proportion to internal pressure loading. Any potential growth is generally preferred in the axial direction. Therefore, axial growth, generated as a result of internal pressure, causes the braid to stretch if it is independently anchored and this stretching creates a radial compressive load on the inner liner, the load being somewhat similar to a Chinese finger lock. This radial compressive load counteracts the attempts of the internal pressure to expand and lift the inner liner outwardly. This feature is not intended to act as a primary seal, but only to complement the initial sealing relative to the increase in internal pressure.

Figure 6:
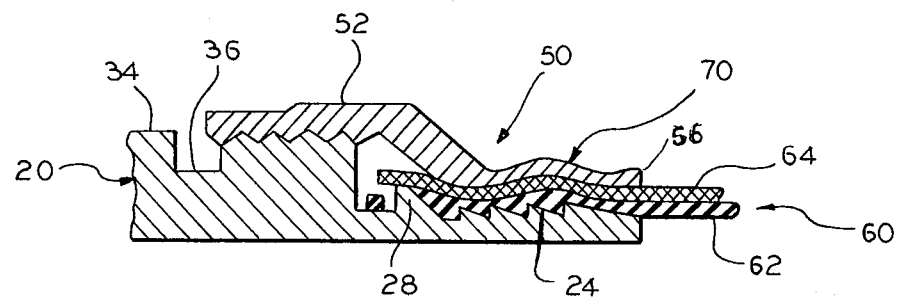
FIG. 6 shows a modification wherein the outside collar is designed to compress the hose.

The embodiment of FIG. 6 is essentially the same as the embodiment of FIGS. 3–5 except that the collar shell section 56 is fairly thin in the region 70. Thus, the collar shell region 70 expands somewhat as the preferably "Teflon" hose is compressed between the barbed end 24 and the collar shell 56. The compressive ratio between the insert and socket can be from 10% to 60% dependent on the hose material. For a plastomer liner, such as polytetrafluoroethylene or nylon, the preferred compressive ratio is approximately 50% of the inner liner thickness.

Preferably, the material 70 has a springlike quality to compress the hose and to compensate for plastic creep. The collar shell 70 thickness should be between 0.010" and 0.020". It could be made of any metallic material which has a high modulus of elasticity, to achieve a high degree of residual stress for spring back at minimal strain. The shell may be tempered, if required, to achieve the desired modulus of elasticity and spring quality.

Figure 7:
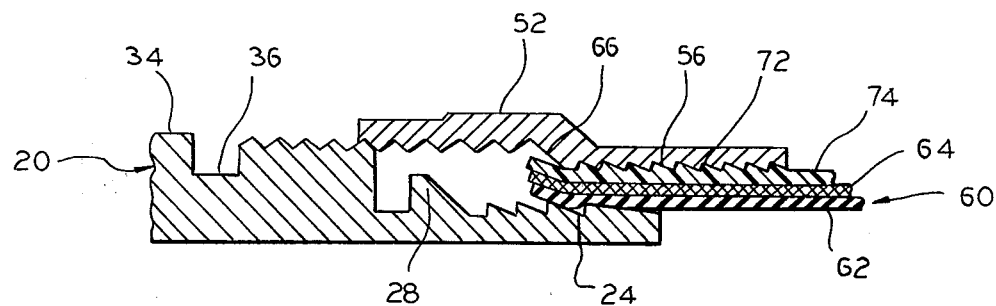
FIG. 7 shows another modification having supplemental threads for pulling the hose into the final attachment position.

In FIG. 7, the collar shell 56 is a little thicker, and the inside of the collar shell 56 has shallow counter threads 72 which turn in a direction opposite to the threads in the threaded section 52. The relationship between the hose thickness and its resiliency is directly proportional to the required clearance between the insert 20 and the collar 50. The interference, or compressive effect, between the inside diameter in the end region 56 of the outer socket and the tapered ramps of the insert barb shanks of the end 24 must be sufficient. That is, the friction between the outer braid 64 and the inside diameter of the socket 56 is greater than the friction between the insert barb shank ramps on the end 24 and the plastomer inner liner 62, so that the hose is pulled forward as the socket engages the insert. In most cases, the plastomer inner liner 62 is a material such as nylon or polytetrafluoroethylene, or elastomeric inner liner. These materials have lower friction resistance than the metallic outer braid 64. When the naturally occuring friction is not adequate to overcome the inner liner friction, such as when a non-metallic braid is used, or when an outer jacket of elastomeric or thermoplastic material is used, then the shallow counter thread 72 is provided in the inside diameter of the socket 56. These counter threads create the required frictional resistance and the forward driving force.

Thus, the counter threads 72 tend to bite into the exterior surface of the hose 60 and to propel it over the barbed end 24 and into the locking position. This particular fitting (FIG. 7) is best when the outer surface 74 of the hose is a material such as a textile or synthetic fabric, or is an extruded resilient material which easily conforms to the threads 72. The FIG. 7 embodiment may also be used with other materials, such as metallic braid.

The primary sealing force of the inventive fitting is achieved by compression of the "Teflon" layer 62 between the barbed end 24 and the collar shell 56. The compression for most hose materials is in the range of 10%–60% of the total thickness. A 35% to 50% compression in thickness is preferred when the material is "Teflon". "Teflon" hose material is the most desired hose material because it has a large temperature usage range of −65° F. to 450° F., and is inert to most fluids. The only detriment for "Teflon" is price, which sometimes dictates a usage of less expensive hose materials.

This compression also causes the hose to stretch axially and to end load the hose against the locking and sealing ridge 28. This axial stretching also tensions the braid 64 which is captured between the locking and sealing ridge 28 and the metal-to-metal locking shoulder 66.

Sealing for both positive pressure and vacuum is achieved by radial compression of the inner liner and by the insert barb shank biting into the inner liner. A secondary back-up seal is further achieved by the axial compression of the inner liner material between the lower insert shoulder of the locking and sealing ridge 28 and the upper socket shoulder 66.

The insert 20 and the collar 50 may be made of any suitable material, such as stainless steel, hardened aluminum or brass, for example. Fittings which are fabricated from cadmium-plated steel have been successfully tested, with no detrimental effects, to extremes from −65° F. to 450° F., which are the limits of the hose inner liner. Also, these fittings completed a general impulse life cycle to 1500 PSIG pressure for 150,000 cycles at 450° F. with no evidence of failure. The hose and fitting materials, not the design concept, dictate the service limitations.

However, the current energy shortage problems put a premium on weight, especially in aircraft where the inventive fitting may be used. Therefore, for these uses, the parts may also be made of composite plastic materials, such as any of many resins reinforced by fibers of glass, boron, carbon or "Kevlar". Other plastics use graphite and epoxy. These plastics have added advantages since they do not deteriorate when attacked by corrosive agents, and they stand up under extreme temperatures which tend to fatigue metals. A composite thermoplastic, such as fiberfilled nylons and polyesters, is also desired because of its increased compressive tensile and shear strengths. The effects of plastic creep, temperature change, aging and impulse life are all related to the type of material chosen for the inventive fitting, and testing is required for any given installation or usage in order to establish these limits.

Those who are skilled in the art will readily perceive how the invention may be modified. Therefore, the appended claims are to be construed broadly enough to cover all equivalent structures.

We claim:

1. A two-piece end fitting comprising an elongated insert means having at least an annular barb on one end and a connector on the other end, said insert having a hose clamping barbed section between said barbed end and said connector end, said barbed section extending from the barbed end toward the connector end and terminating in an annular locking ridge with a shear surface, said locking ridge being followed by a first threaded section, collar means having a collar shell and a second threaded section with a sealing shoulder therebetween, said shoulder and said ridge cooperating to form an annular shearing edge when said first and second threaded sections are in a closed position, said barbed section having dimensions which receive and fit into a hose, said second threaded section having a length relative to the length of said barbed section such that when said first and second threaded sections mesh a hose fitted into said collar shell projects beyond said shell and over said shoulder whereby a pilot end section of said hose is formed, the relative dimensions of said insert means, collar means and hose being such that said collar shell pulls said pilot end over said barbed section as said first and second threaded sections are turned and close upon each other thereby shearing a tip of said hose between said shoulder and said ridge which occurs responsive to the travel of said sections when said first and second threaded sections are turned upon each other, at which time said collar fits over and surrounds said barbed section with said end section of said hose therebetween.

2. The end fitting of claim 1 and a clearance space between said locking ridge and said first threaded section for receiving said sheared off tip.

3. The end fitting of claim 1 wherein said sealing shoulder and locking ridge are dimensioned to capture and hold any braid which may be on said hose.

4. The end fitting of either one of the claims 2 or 3 wherein said collar shell includes counter threads which tend to bite into said hose and propel it over said barbed end as said first and second threaded sections are turned and close upon each other.

5. The end fitting of either one of the claims 2 or 3 and wrench faces on said insert means and said collar means to enable said fitting to be opened and closed in the field.

6. The end fitting of either one of the claims 2 or 3 wherein said collar shell has a relatively thin wall which is of a small diameter as compared to the diameter of said hose so that said shell is expanded as said collar is pulled over the end of said hose to compress said hose against the barbed section when said collar fits over said barbed section with said hose end section therebetween.

7. The end fitting of claim 6 wherein said expanded section has springlike qualities.

8. The end fitting of either one of the claims 2 or 3 wherein the dimensions of said insert and collar are such that the hose on said barbed end is compressed to reduce its thickness by 10%–60%.

9. The end fitting of claim 8 wherein said thickness is reduced by substantially 35%.

10. The end fitting of claim 8 wherein said dimensions are such that said hose is axially thrust against said locking ridge responsive to said compression.

11. A two-piece end fitting comprising one piece having first barbed and threaded means fitting into the bore of a hose having an end, a second piece having a threaded collar means fitting over the outside periphery of said hose, complementary means on said first and second pieces for gripping said end of said hose and pulling it over said barbed means when said first and second means are threaded into each other, and cooperating shearing edges on said first and second means for cutting off a tip end of the hose responsive to threading said first and second means into each other.

12. An end fitting for a hose having an outside surface and an internal bore, said fitting comprising a threaded collar member for fitting over the outside surface of said hose, an elongated threaded insert means for fitting into the bore on said hose, the threads on said collar and on said insert causing said collar to travel relative to said insert and to cooperatively pull a hose in said collar over said insert, said insert having an outside surface which fits snugly and sealingly against the interior surface of said bore thereby forming a first seal extending longitudinally along the length of said insert where it engages the interior of said hose, a cooperating pair of annular shear members formed on the outside of said insert and on the inside of said collar for cutting off a tip of the end of said hose responsive to the travel of said collar and insert pulling upon said hose which is caused by a turning of said threads upon each other, said travel and said cut off end jamming the end of said hose into a sealing contact with one of said annular members where it is held in said sealing contact by the other of said annular members thereby forming a second seal at the end of said hose, whereby there is a twin seal at the longitudinal surface of said insert and at the abutment surface on the hose end.

13. The end fitting of claim 12 wherein said snug sealing surface between the interior of said hose and the outside surface of said insert comprises at least one annular barb formed on said insert, said collar member having a thickness such that said collar member expands as said hose is pulled over said insert, the expansion of said collar being such that said snug sealing surface reliably seals said insert against said hose without causing damage to said hose.

* * * * *